US008480839B2

(12) United States Patent
Ganz

(10) Patent No.: US 8,480,839 B2
(45) Date of Patent: Jul. 9, 2013

(54) METHOD FOR MANUFACTURING COMPOSITE SYSTEMS MADE OF METAL AND POLYMER SHAPED PARTS

(75) Inventor: Arnold Ganz, Lautertal (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 0 days.

(21) Appl. No.: 13/269,902

(22) Filed: Oct. 10, 2011

(65) Prior Publication Data

US 2012/0048461 A1 Mar. 1, 2012
US 2013/0042971 A2 Feb. 21, 2013

Related U.S. Application Data

(63) Continuation of application No. 10/994,725, filed on Nov. 22, 2004, now Pat. No. 8,066,841, which is a continuation of application No. PCT/DE03/01661, filed on May 22, 2003.

(30) Foreign Application Priority Data

May 22, 2002 (DE) .................................. 102 23 039

(51) Int. Cl.
*B32B 37/06* (2006.01)
(52) U.S. Cl.
USPC ...................................................... 156/272.4
(58) Field of Classification Search
USPC ........... 156/272.4, 272.2, 273.7, 273.9, 275.5
See application file for complete search history.

(56) References Cited

U.S. PATENT DOCUMENTS

| 2,545,370 | A |   | 3/1951 | Mittelmann |
|-----------|---|---|--------|-----------|
| 2,572,160 | A | * | 10/1951 | Kelly, Jr. et al. ............... 403/228 |
| 3,387,839 | A |   | 6/1968 | Miller et al. |
| 3,695,228 | A |   | 10/1972 | King |
| 3,698,703 | A | * | 10/1972 | Hipsher ........................ 267/219 |

(Continued)

FOREIGN PATENT DOCUMENTS

| CH | 463 088 A | 9/1968 |
|----|-----------|--------|
| DE | 30 38 069 A1 | 4/1982 |

(Continued)

OTHER PUBLICATIONS

International Search Report in PCT/DE03/01661 dated Oct. 23, 2003.

(Continued)

*Primary Examiner* — Daniel McNally
(74) *Attorney, Agent, or Firm* — Marshall, Gerstein & Borun LLP

(57) ABSTRACT

A method for manufacturing composite systems including metal and polymer shaped parts in the form of stabilizers, bushings, axle bearings, especially in the chassis area, stops, buffers, especially for supporting arms for aggregate bearings, or sleeve bearings, especially torsion-bar shoulder bearings, is provided. With the method, at least one completely vulcanized or partially vulcanized elastomer shaped part, especially a rubber shaped part, as the polymer shaped part and at least one metal part are first prepared. The metal part and the polymer shaped part are then brought into abutment against one another, at least in parts. And, finally the metal part or at least one region of the surface on which the metal part and the polymer shaped part abut against one another, is at least temporarily exposed to at least one induction field or at least one inductive heating unit.

1 Claim, 2 Drawing Sheets

U.S. PATENT DOCUMENTS

| | | | |
|---|---|---|---|
| 4,380,484 A | 4/1983 | Repik et al. | |
| 4,390,668 A | 6/1983 | Garver | |
| 4,849,047 A * | 7/1989 | Ferguson | 156/273.9 |
| 5,629,061 A | 5/1997 | Kass | |
| 5,761,323 A | 6/1998 | Kameda et al. | |
| 6,083,558 A | 7/2000 | Bremont | |
| 6,109,903 A * | 8/2000 | Inoue et al. | 425/174.8 R |
| 6,174,398 B1 | 1/2001 | Dieterich et al. | |
| 6,203,306 B1 | 3/2001 | Inoue et al. | |
| 6,363,613 B1 * | 4/2002 | Wolf et al. | 29/896.91 |

FOREIGN PATENT DOCUMENTS

| | | |
|---|---|---|
| DE | 31 30 586 A1 | 4/1982 |
| DE | 31 08 221 A1 | 1/1983 |
| DE | 197 21 378 A1 | 11/1998 |
| DE | 199 19 573 A1 | 11/2000 |
| EP | 0095112 A1 | 11/1983 |
| EP | 684404 A1 | 11/1995 |
| FR | 2 593 467 A1 | 7/1987 |
| GB | 957385 A | 5/1964 |
| GB | 1161902 A | 8/1969 |
| JP | 54058778 A | 5/1979 |
| JP | 60099635 A | 6/1985 |
| JP | 60132736 A | 7/1985 |
| JP | 04086245 A | 3/1992 |
| JP | 04267131 A | 9/1992 |
| JP | 11198152 A | 7/1999 |
| JP | 2003148454 A | 5/2003 |
| WO | WO-96/21550 A1 | 7/1996 |

OTHER PUBLICATIONS

International Preliminary Examination Report in PCT/DE03/01661 dated Aug. 18, 2004.

Official Action in DE 102 23 039.0 dated Mar. 28, 2003.

* cited by examiner

METHOD FOR MANUFACTURING COMPOSITE SYSTEMS MADE OF METAL AND POLYMER SHAPED PARTS

CROSS-REFERENCE TO RELATED APPLICATION

This is a continuation of U.S. patent application Ser. No. 10/994,725, filed Nov. 22, 2004, which is a continuation of International Application PCT/DE03/01661 filed May 22, 2003, the entire disclosure of each of which is hereby incorporated herein by reference.

BACKGROUND

1. Field of the Disclosure

The disclosures relates to a method for manufacturing composite systems made of metal and polymer shaped parts, especially of metal/rubber composite systems.

2. Related Technology

Methods for manufacturing metal/rubber composite systems have been known for some time and are becoming increasingly important, e.g. in automobile construction. Such composite systems are distinguished by the fact that they combine the advantageous properties of metal and rubber, i.e., on the one hand, they are rigid and torsion-resistant and on the other hand they also have permanent-elastic properties. In addition, such composite systems regularly have a lower intrinsic weight compared with alternative devices.

Hitherto, substantially two methods for manufacturing metal/rubber composite systems have been available to the person skilled in the art for stabilizers, bushings, axle bearings, especially in the chassis area, stops, buffers, especially for supporting arms for aggregate bearings, or sleeve bearings, especially torsion-bar shoulder bearings and/or the like. According to a first method, metal parts inserted in a vulcanizing tool are first surrounded with an unvulcanized elastomer, e.g., sprayed around, whereupon the vulcanizing yields a metal/rubber composite. In order that useful bond is found between rubber and metal, an adhesion system is usually required which is to be applied to the metal parts to be used in a first step. Such a method is described, for example, in EP 0 684 404 A1. This method, also known as vulcanisation, usually requires long cycle times since the metal part must initially be heated to a pre-determined temperature. Since the metal part must be inserted in the vulcanizing tool, a special vulcanizing tool usually needs to be made for each newly shaped composite component. In addition, only a comparatively small number of tool calibres can be realized. It is also disadvantageous that in order to be able to insert the metal parts reliably and reproducibly in the vulcanizing tool, a considerable expenditure on apparatus is required. Furthermore, the demolding process of the finished composite components does not always proceed problem-free, especially since the vulcanisation takes place at high pressures so that a considerable proportion of waste must usually be accepted. Finally, the surface of the metal parts in the vulcanizing tool is frequently damaged, e.g., in the form of pressing edges. In order to nevertheless achieve usable metal/rubber composite systems, great care must be taken both when inserting the metal part into the vulcanizing tool and during the demolding process. As a result, very long processing times on the vulcanizing press are additionally obtained. Thus, not only the vulcanizing duration but also the tool handling as such contribute to long cycle times. In addition, an increased liability to corrosion is observed for metal parts provided with unvulcanized elastomer sleeves. The vulcanizing method is particularly expensive, for example, if a sleeve bearing is to be manufactured. Sleeve bearings are usually composed of a rigid outer sleeve and a rigid inner sleeve mounted coaxially therein at a distance, which are bonded by a sleeve of elastomer material.

In a second so-called postbonding method, an already partially vulcanized rubber shaped part is used. The rubber shaped part is fixed and pressed on a metal part using a clamping device while generating the highest possible prestress before a bond is produced between metal and rubber in an annealing furnace while completely vulcanizing the rubber shaped part. In this method also, the metal part is usually provided with an adhesive layer. Such a postbonding method is described for example in DE 199 19 573 A1 for the manufacture of a torsion bar shoulder bearing. A reliably adhering bond is however only obtained if the heating period at a pre-defined temperature is not too short and is in the range of at least 20 to 40 min. In practice, however, the tempering times are frequently even 60 to 90 min. This necessarily results in relatively long cycle times. In order to be able to work profitably with the method according to DE 199 19 573 A1, high numbers of pre-assembled metal/rubber systems which are each to be fixed and pressed with a plurality of separate clamping devices, regularly need to be inserted in the furnace. In addition to a high expenditure on equipment, a high work expenditure which is incurred, for example, by the assembly and dismantling of the clamping devices, generally cannot be avoided. It is also disadvantageous in the method according to DE 199 19 573 A1 that only suitable are those elastomer shaped parts which when demolded, are cross-linked free from bubbles on the one hand and on the other hand, are not yet completely vulcanised so that free vulcanisation valences are still present in the elastomer. On the whole, therefore, the postbonding method is very expensive and cost-intensive, especially for manufacturing larger numbers of items.

In the field of manufacturing cables or metal wires coated with rubber, further methods unsuitable for the manufacture of shaped parts are known. Thus, for example, according to U.S. Pat. No. 3,695,228 unvulcanized rubber is used in tire manufacture, especially in the manufacture of tire cores, where a metal wire provided with unvulcanized rubber is guided through a metal coil attached in a pressure chamber, which generates a high-frequency induction field. In this way, a rubber coating is obtained with a high degree of vulcanisation in the vicinity of the metal wire and a low degree of vulcanisation in the outer edge region of the rubber coating. This outer region is accordingly sticky and easily adheres to any surfaces so that the coated wires cannot easily be handled separately and generally are not handled separately. In addition, the use of a pressure chamber to produce this coated wire necessarily limits the geometry and size of the coating bodies which can be used. The method according to U.S. Pat. No. 3,695,228 is thus not suited for the mass production of individual parts. Technical rubber shaped parts are not accessible in this way.

Induction heating is also used, for example, to activate at adhesive material. WO 96/21550 discloses the activation of an adhesive between a metal part and a rubber part surrounding this by means of an induction field.

Furthermore, the activation of an adhesive via an induction field during the manufacture of bonded plastic and metal profiles is also known from DE 31 08 221 A. Moreover, induction fields are also used to bond surfaces of thermoplastic plastics with one another or with other materials such as paper or cardboard. Thus, CH 463088 A discloses a method in which a metal foil, especially an aluminium foil, is inserted between two surfaces to be bonded, for example, between two plastic surfaces and is then inductively heated so that a thermoplastic plastic foil or thermoplastic plastic lamination is formed. Such foils or laminates are especially suitable for water-vapour and aroma-proof packaging but not for the manufacture of shaped parts, especially sleeve bearings.

According to DE 30 38 069 A1, an induction field can also be used in the manufacture of disposable cannulas of disposable syringes by melting a metal cannula tube in a plastic attachment by temporally producing heating current heating in the region of the cannula tube adjacent to the attachment to melt the plastic of the attachment on the cannula tube.

In addition, according to JP-04267131A a glass-fiber-reinforced nylon gearing is fixedly attached to a steel shaft by applying a high-frequency induction field in which fusion takes place in the contact region of the gearing with the shaft.

SUMMARY OF THE DISCLOSURE

The disclosure provides a method for manufacturing metal/rubber composite systems for which is free from the disadvantages of known methods, makes short cycle times possible, minimizes expenditure on apparatus and space requirement, manages with low investment costs, allows a high degree of flexibility with regard to shape and size of the composite system, and can also be considered for mass production.

BRIEF DESCRIPTION OF THE DRAWINGS

The disclosure is explained in detail subsequently with reference to exemplary embodiments in conjunction with the drawings. In the figures.

DETAILED DESCRIPTION

Figure 1:
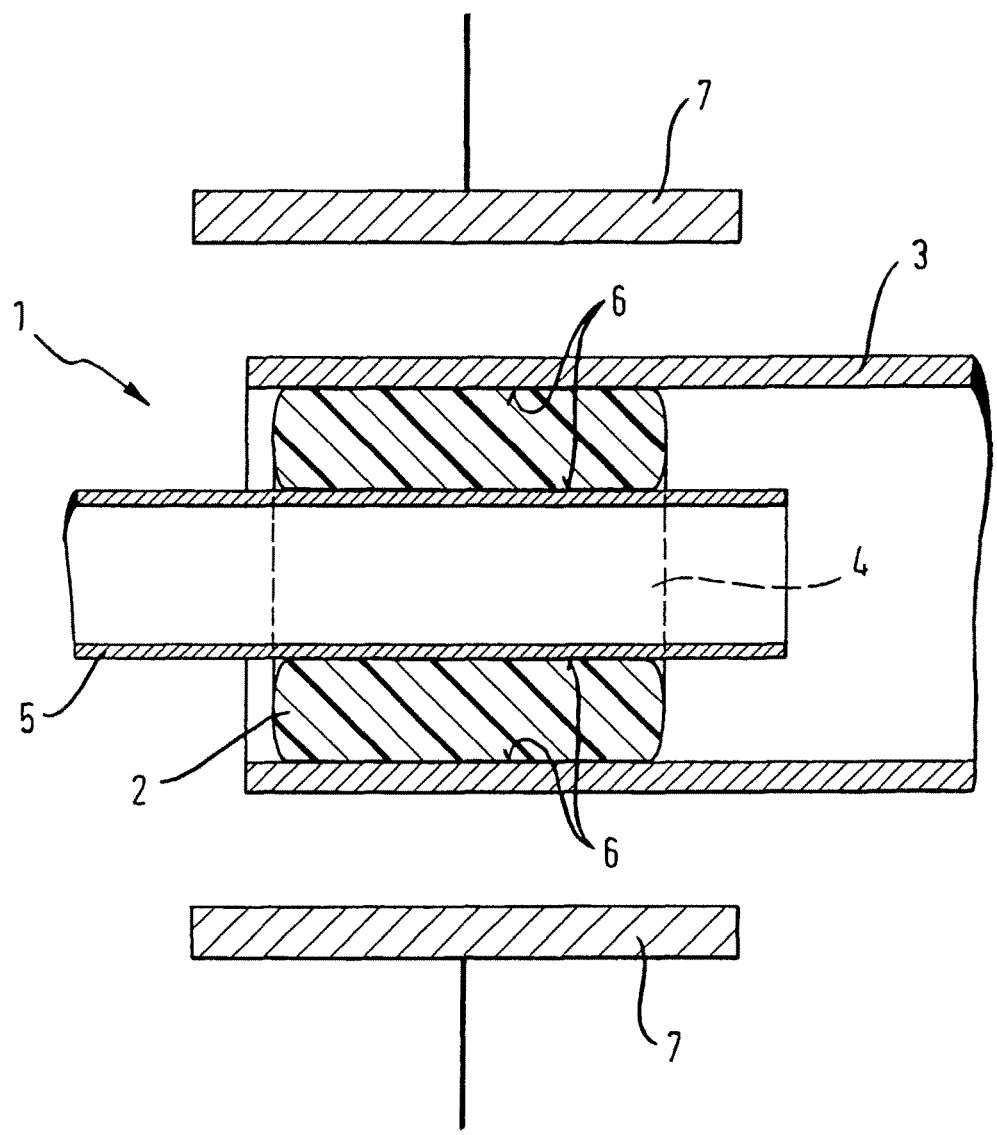
FIG. 1 shows a sleeve bearing manufactured using the disclosed method in an inductive heating unit in axial cross-section.

Accordingly, the disclosure provides a method for manufacturing composite systems comprising metal and polymer shaped parts, comprising the step of preparing at least one at least partially vulcanized rubber shaped part, as the polymer shaped part and at least one metal part bringing the metal part and the polymer shaped part into abutment against one another, at least temporarily exposing at least one region of a surface on which the metal part and the polymer shaped part abut against one another to at least one induction field of at least one inductive heating unit applied at a frequency of up to 25 kHz and maintained at least until a pre-determined activation or adhesion temperature of the metal part is reached, and pressing together the polymer shaped part and the metal part before and/or during and/or after exposing the metal part abutting against the polymer shaped part to a low-frequency induction field.

In the disclosed method, at least one metal part and at least one polymer molded part, especially a rubber molded part, abut against one another at least in parts, wherein the metal part or at least one region of the surface on which metal part and polymer molded part abut against one another, also called the contact surface, is exposed at least temporarily, preferably for at least 10 sec, continuously or at intervals, to a low-frequency or moderate-frequency induction field of at least one induction heating unit.

Suitable metal parts can be solid or hollow and, for example, in the form of rods or tubes, for example having round or beveled cross-sections. All suitable metal construction materials, for example, can be used. Metal parts made of steel, for example, are preferably used. Moreover, especially non-ferrous metals such as antimony, lead, cadmium, cobalt, copper, bismuth, zinc and their alloys as well as metals with oxide-forming or oxidized surfaces are especially suitable. The geometry and size of the metal parts used can be freely varied within broad limits. The metal surface can, for example, be smooth, polished or, especially in the region where the bond is to take place, roughened. Furthermore, varnished, for example, powder-varnished surfaces are naturally also suitable.

Useful polymer shaped parts include molded parts made of an elastomer material, i.e., having a spring-elastic property profile, e.g. made of thermoplastic elastomers (TPEs), elastic block copolymers , e.g. Kraton® (Shell), natural or synthetic rubber, e.g. natural rubber or silicone rubbers, especially in vulcanized form and especially vulcanized rubber. In this case, almost or partially vulcanized elastomer material, especially rubber is used. In this connection vulcanization takes place under the action of a certain temperature and a certain pressure for a certain time, so that the degree of vulcanization can be determined by influencing temperature, pressure, and time. In this connection, the elastomer shaped part vulcanized at least so far that it already satisfies the requirements imposed on it, especially with regard to stiffness and lifetime. For example, the elastomer molded part can be vulcanised at a temperature of about 180° C. in a vulcanization shaping tool with an inner pressure of about 40 bar for five minutes so that it is at least partly vulcanised.

It is preferable that the polymer shaped part at least partially, and preferably completely surrounds or envelops the metal part. For example, a cylindrical or rectangular metal rod can be surrounded, for example, in sections by a sleeve of an elastomer polymer material, especially under pre-stress. When a shaped part made of an elastomer material envelopes a metal part at least in regions or in sections completely, it has proven to be advantageous if a pre-stress of about 3% to 15% is adjusted in the region.

For the implementation of the method it is advantageous if the metal and/or polymer shaped parts abutting against one another are fixed. In this way it is avoided that metal and polymer shaped parts leave the desired pre-set position before or during the production of the composite system.

It is especially preferable that the polymer molded part and the metal part are pressed together, especially using at least one clamping device, before but at least during and/or after the metal part abutting against the polymer shaped part is or has been exposed to a low-frequency or moderate-frequency induction field.

By using an externally applied pressure on the abutting metal and polymer shaped parts, a more intimate bond is usually achieved in the composite system of metal and polymer shaped parts. In this case, it is generally favorable to maintain the pressure for at least 10 sec, preferably for at least 30 sec while the metal and polymer shaped parts are exposed to the induction field wherein this time interval more suitably lies towards the end of the heating phase. For practical considerations the pressure is usually already built up by suitable clamping devices before abutting metal and polymer shaped parts are exposed to a low-frequency induction field and is maintained during the exposure phase.

It is advantageous if the clamping pressure produced, for example, by one or a plurality of clamping devices is maintained after the end of the heating process by the inductive heating unit for a certain time. It has been found to be suitable to maintain the pressure for at least about 10 sec. Furthermore, it has also been found that in general a duration of 10 sec to 20 sec is sufficient to produce improved adhesion between metal and polymer shaped parts in the composite system. The clamping pressure is preferably maintained after the end of the heating process for a duration of 20 sec to 55 sec, especially preferably 55 sec to 300 sec, wherein optimised results are already achieved for a duration of 55 sec to 70 sec. It has been found that especially good results are obtained if pressure and temperature are introduced such that there is first a heat introduction phase and then a temperature holding phase which can each last about 30 second and over which the pressure is applied in each case.

Suitable clamping devices for building up and maintaining the pressure are generally already known, for example, from the postbonding method. Clamping devices made of metal are usually used. However, non-metallic clamping devices e.g. those made of a mechanically stressable plastic such as polyamide, polyoxymethylene or syndiotactic polystyrene or an impact-modified variant or Kevlar or those made of ceramic materials can also be used. The use of non-metallic clamping devices has the advantage that they can also be attached in the area of the induction field without themselves being heated during the production of the composite system. As a result, not only the number of possibilities for the attachment of such clamping devices is increased but also the outer surface of the polymer molded part is not thermally stressed as is frequently the case with metal clamping devices. As a result, the elastic properties of the polymer shaped part, especially the rubber shaped part are not affected and the optics of the surface is not impaired.

At least one continuous or discontinuous adhesive layer can be present at least in parts between abutting metal and polymer shaped parts. As suitable adhesive or sticking materials, it is possible to consider for example, two-component adhesion promoters, for example, consisting of a primer and a cover, such as are usually used for the permanent bonding of metal and plastics, e.g. rubber. Such two-component adhesion promoters are available commercially, e.g. in the form of the product Chemosil from Henekl KGaA, Düsseldorf. Furthermore, a single-component adhesion promoter can be used alone as an adhesive layer. The processing is thereby simplified and the processing time is shortened. In addition, the material expenditure is reduced.

Especially when using metal parts based on non-ferrous metals or their alloys as well as metal parts with oxidized, preferably oxide-forming surfaces, it is possible to completely dispense with any adhesive system to produce a composite system satisfying the most stringent requirements. Accordingly, for example, in one embodiment of the invention using silicone rubbers, e.g., using or applying liquid silicones, especially to oxidized, preferably oxide-forming metal surfaces, no adhesion promoters are used.

The induction field can be maintained at least until a pre-determined activation or adhesion temperature is reached. In this case, the metal part is usually heated by means of the inductive heating unit to a pre-determined temperature, especially in the range of about 125° C. to about 220° C.

It can be provided that after reaching the pre-determined activation or adhesion temperature at least once for a time interval, the region in which the metal part and polymer shaped part abut against one another and which should form the bond, is not exposed to any induction field. For example, for this case the induction field can be briefly switched off or reduced in intensity, e.g. for a period of 5 sec to 10 sec and then started up again, usually for a short time interval of for example 3 sec to 10 sec, for heating the metal part.

As inductive heating units, it is possible to use those that can generate a low-frequency or moderate-frequency induction field into which the region of the metal part and polymer shaped part to be bonded can be inserted at least temporarily. The heating unit can, for example, be present in the form of a coil of different diameter or in the form of separate spaced electrodes or poles. Great flexibility with regard to the geometry of metal and polymer shaped parts is especially achieved by using poles. Induction fields as well as possibilities and devices for their generation are generally known to the person skilled in the art. An induction field may comprise those having a frequency in the range of about 40 Hz to about 25 Hz, wherein frequencies in the range of about 50 Hz to 250 Hz, preferably from 80 Hz to 150 Hz and especially from 100 Hz to 120 Hz are completely sufficient to obtain high-quality composite systems. The use of low-frequency or moderate-frequency induction fields, among other things, also has the advantage that the region of the metal part to be heated can be locally delimited whereby specific heating is achieved.

The metal part can be exposed to the induction field for a total duration of at least 10 sec.

With the aforementioned inductive heating units, metal parts, for example, made of steel, especially metal tubes can be heated to temperature of 150° C. and higher within a short time. Generally a heating duration of about 30 sec, preferably about 40 sec is sufficient to achieve heating to about 200° C. or higher. It is especially advantageous for an uncomplicated and simple management of the process that the desired final temperature can be adjusted via the heating duration wherein a single preliminary test is generally sufficient in which the surface temperature of the metal is to be determined. The reproducibility has a tolerance of about 4° C. In all further heating cycles a temperature measurement can thus be completely dispensed with. If the heating properties of the metal part to be bonded in an induction field are otherwise known, the previous determination of the required temperature can be completely dispensed with. In order to optimise the adhesive behavior when using an adhesive layer, the thermal behavior of the adhesive should be taken into account if necessary.

It is advantageous that the inductive heating unit is in contact with a clamping device, especially fixed in position. Since the clamping device is located in the immediate vicinity of the region to be bonded, alignment and if necessary fixing of the inductive heating unit to the region to be bonded is especially simple. In general, especially clamping devices made of metal can easily be attached or fixed in the vicinity of the inductive heating unit or the induction field without influencing the induction field or being influenced thereby.

It is possible to use metal clamping devices which themselves are part of the inductive heating unit. When connected to the heating unit, an induction field can then be generated via the clamping devices, which then leads directly to heating of the underlying metal part. For example, an induction coil can be integrated in a clamping device. The region to be bonded can then be influenced via the size or width and/or form of the clamping devices and their adjustment. In general, suitable care should be taken here to ensure that the clamping device itself does not form any bond with the polymer shaped part. For example, such a clamping device can be provided with a non-metallic coating, e.g. made of plastic.

It is possible to obtain composite systems of metal and polymer shaped parts whose abutting regions can no longer be separated from one another non-destructively. Preferred embodiments of this composite system can only be separated by complete or almost complete rupture in the polymer shaped part or in the rubber part (100% rubber fracture) i.e., no separation or almost no separation takes place along the metal/polymer shaped part or rubber part interface. For example, it is possible to obtain composite shaped parts in the form of stabilizers made of metal and polymer shaped parts or rubber shaped parts which have a tearing force greater than 10 kN, especially greater than 15 kN. Tearing force can be understood, for example, as that force which needs to be applied to detach the polymer shaped part or the rubber shaped part from the metal part of the composite system. Tearing forces can, for example, be determined in a stripping test in which a force is applied to a side surface of a polymer shaped part. Naturally, it is also easily possible to reproducibly produce composite systems with tearing forces greater than or equal to 20 kN. Such composite systems, especially metal/rubber composite systems can easily be used for numerous applications, e.g. in automobile construction. Tearing forces depend on many factors e.g. on the surface present in the composite, and therefore vary widely. Preferred composites are distinguished by the fact that a tear does not take place at the surface to the metal i.e., at the binding surface but in the polymer shaped part. Thus, the material strength of the polymer shaped part e.g. of the rubber shaped part and if necessary also its geometry predetermine the tearing force.

Accordingly, metal/polymer composite systems manufactured using the disclosed method can be considered, for example, as stabilizers, bushings, axle bearings, especially in the chassis area, stops, buffers, especially for supporting arms for aggregate bearings, or sleeve bearings, especially torsion-bar shoulder bearings.

According to a further aspect, the disclosed method is also suitable for the especially automated series manufacture of composite systems made of metal and polymer shaped parts.

A method for the series manufacture of composite systems made of metal and polymer shaped parts is provided, wherein
a) at least one metal part A and at least one polymer shaped part A are abutted against one another, at least in parts, wherein abutting regions if necessary have an adhesion promoter,
b) the abutting regions are pressed, at least in sections, especially using a clamping device,
c) the metal part A or the abutting regions of metal part A and polymer shaped part A are exposed, at least in sections, to an induction field generated by at least one inductive heating unit,
d) the pressing is maintained for a time interval after the abutting region is no longer exposed to the induction field, and
e) the pressing ends, especially by opening the clamping device,
wherein at least one metal part E and at least one polymer shaped part E are abutted against one another (step a'''') and/or wherein at least one metal part D and at least one polymer shaped part D are pressed at abutting regions, at least in sections (step b''') before they are exposed to a low-frequency induction field, and/or wherein at least one metal part C or the abutting regions of metal part C and polymer shaped part C, are exposed at least in sections to an induction field generated by at least one inductive heating unit (step c'') and/or wherein the pressing of abutting regions of metal part B and polymer shaped part B, after this abutting region is no longer exposed to the induction field, is maintained for a time interval (step d') whereas the pressing of metal part A and polymer shaped part A is ended, especially the clamping device is opened (step e).

In alternative embodiments of this method for series manufacture step d or steps b, d and e can be dispensed with.

Series manufacture can accordingly be carried out in a timed fashion. In this case, very large numbers of items can be obtained in a short time. Here it is also advantageous that only a very small number of clamping devices need be used, especially compared to conventional methods.

Clamping devices include bracing devices, especially pneumatic, mechanical and/or hydraulic bracing devices. It is surprisingly possible to achieve very short cycle times with the disclosed method. Thus, it is usually sufficient to expose the abutting metal/polymer shaped part systems to an induction field for less than one minute. If clamping devices are used for pressing, a very short time interval after leaving the induction field is already sufficient, while the pressure is maintained, to obtain a further improved bonding in the metal/polymer shaped part composite system with further improved tearing forces. Generally time intervals of about one minute are also sufficient for this after-pressing phase. It is also advantageous that the heating can be locally delimited whereby, for example, other devices pre-mounted or mounted on the metal part are not damaged or affected. Metal clamping devices are also used without these heating up, as is otherwise usual when using annealing furnaces. Thus, it is unnecessary to use protective clothing or gloves or to accept cooling times in connection with the removal of such clamping devices. The handling of clamping devices as a whole is easier and less hazardous. In addition, the disclosed method ensures very uniform heating of the metal part which generally results in a very uniform bond. In addition, the polymer shaped part is only locally heated in the contact area with the metal part whereby there is no thermal stressing of the entire polymer shaped part. Composite systems of reproducible quality are consequently obtained. It is furthermore advantageous that composite systems of larger dimension or those with complex geometry can also be produced without any problems and without greater increased expenditure.

For example, to manufacture the bearing 1 shown in FIG. 1, a sleeve-shaped elastomer sleeve element 2 is produced in a vulcanizing tool. In the present case, the elastomer part 2 was substantially completely vulcanized. To produce an at least slight pre-stress, this part is dimensioned so that it has an outside diameter which is slightly larger than the inside diameter of an exterior connecting sleeve 3 of the sleeve bearing 1. The elastomeric element 2 can have a cylindrical hole 4 by means of a central through bore. Alternatively during the manufacture of the elastomer part 2 the shaping tool can provide such a central hole 4. Again, the diameter of this hole 4 should be dimensioned so that, especially after clamping into the connecting sleeve 3, it is slightly smaller than the outside diameter of an inner sleeve 5. Surfaces 6 of inner and outer sleeves 5 or 3 which come in contact with the elastomer shaped part 2 can be treated with an adhesion promoter. In the system of inner and outer sleeves 5, 3 and the elastomer shaped part 2 there is inherently a pressure. If, as in the present case, as a result of the dimensioning described of the inner sleeve, outer sleeve and elastomer shaped part, a pressure is already exerted on the latter, external clamping devices can naturally be dispensed with. This device is brought into a low-frequency induction field, generated by an inductive heating unit 7 and left there for 60 sec. About 60 sec after switching off the induction field or removing from the same, the clamping device is released or removed. The metal parts 3, 5 exposed to the induction field reach a final temperature of about 200° C., and two binding surfaces are produced in one operation. The tearing test yields a fracture edge in the composite system 1 whose total area lies in the polymer shaped part.

Figure 2:
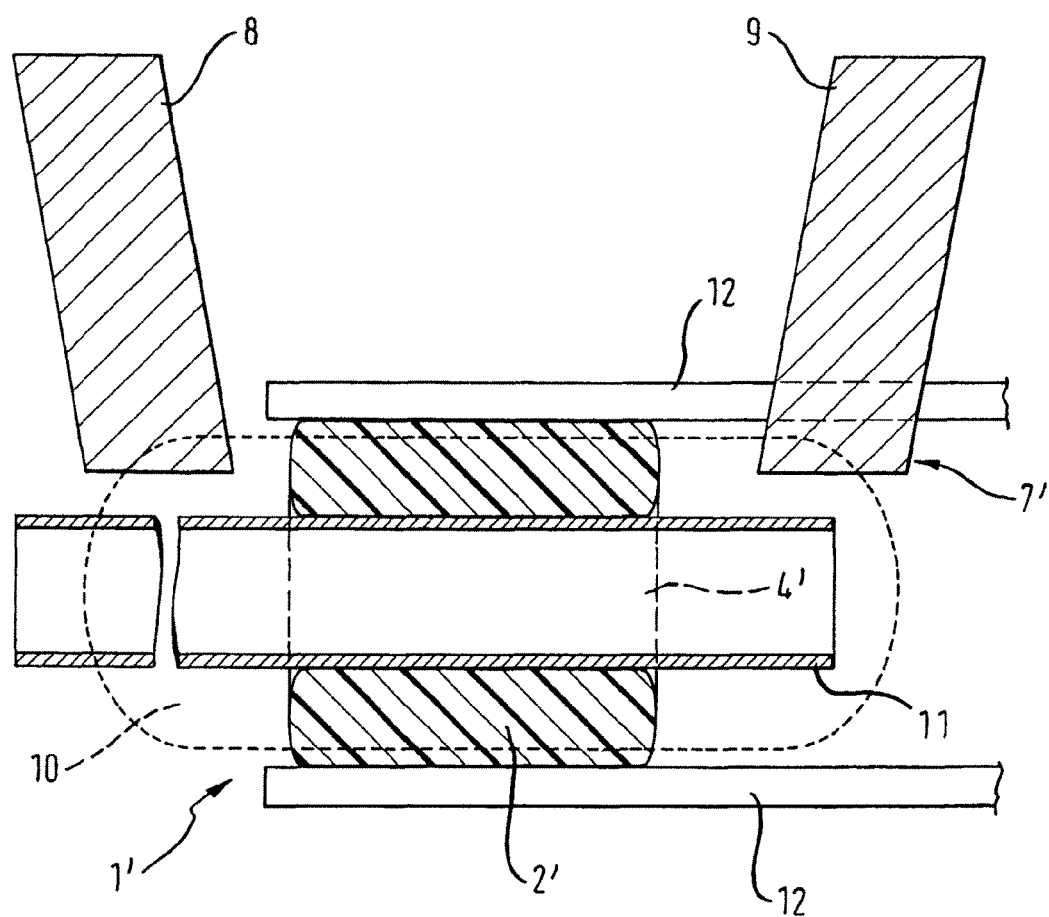
FIG. 2 shows a stabilizer manufactured using the disclosed method in an inductive heating unit in axial cross-section.

An arrangement for the manufacture of a stabiliser 1' can be seen from FIG. 2. Poles 8, 9 of an inductive heating unit 7' are not located on opposing sides of the composite system as in FIG. 1 but are spaced apart on one side of the region to be bonded. An elastomer shaped part 2' in the form of a hinged sleeve or two half-shells is pulled onto a metal sleeve 11. As a result of the dimensioning of the central hole 4' in the elastomer shaped part 2', pre-stressing occurs as described in FIG. 1. The elastomer shaped part 2' and the metal sleeve 11 are pressed with one another by means of clamping devices 12. An induction field 10 can be adjusted so that its strength is sufficient to heat the metal sleeve 11 to the desired adhesion or activation temperature but the clamping devices 12 remain substantially uninfluenced by the induction field 10. In this way, the metal clamping devices 12 of the conventional type can easily be used without these themselves forming a bond with the elastomer shaped part. After manufacture of the composite system has been completed, the clamping devices 12 can easily be removed and the stabiliser 1' can be removed.

As a result of the short cycle times and the simple and flexible application of an induction field to various composite systems, the disclosed method can especially be used for mass production. Compared to the conventional use of annealing furnaces, the method also manages with a substantially smaller number of clamping devices. In particular, large components made of metal and/or plastic or rubber can easily be processed.

I claim:

1. A method for manufacturing composite systems for stabilizers, bushings, axle bearings, stops, buffers, or sleeve bearings, the composite systems comprising metal and polymer shaped parts, comprising:

providing at least one partially or fully vulcanized rubber shaped part as a polymer shaped part and at least one metal part;

bringing the metal part and the polymer shaped part into abutment against one another;

at least temporarily exposing at least one region of a surface on which the metal part and the polymer shaped part abut against one another to at least one low frequency or moderate-frequency induction field of at least one inductive heating unit until a pre-determined activation or adhesion temperature of the metal part of about 200° C. or higher is reached; and, pressing together the polymer shaped part and the metal part before and/or during and/or after exposing the metal part abutting against the polymer shaped part to the at least one low-frequency or moderate-frequency induction field, thereby bonding the polymer shaped part to the at least one metal part.

* * * * *